(12) United States Patent
Saito et al.

(10) Patent No.: US 9,669,819 B2
(45) Date of Patent: Jun. 6, 2017

(54) HYBRID VEHICLE

(71) Applicant: TOYOTA JIDOSHA KABUSHIKI KAISHA, Toyota-shi, Aichi-ken (JP)

(72) Inventors: Tatsuki Saito, Nagoya (JP); Yoshimitsu Takahashi, Miyoshi (JP); Shoichi Sasaki, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 17 days.

(21) Appl. No.: 14/841,084

(22) Filed: Aug. 31, 2015

(65) Prior Publication Data

US 2016/0075322 A1    Mar. 17, 2016

(30) Foreign Application Priority Data

Sep. 17, 2014    (JP) ................... 2014-188638

(51) Int. Cl.
| | |
|---|---|
| *B60W 20/00* | (2016.01) |
| *B60W 10/06* | (2006.01) |
| *B60W 10/08* | (2006.01) |
| *B60K 6/365* | (2007.10) |
| *B60K 6/42* | (2007.10) |

(Continued)

(52) U.S. Cl.
CPC ............ *B60W 20/10* (2013.01); *B60K 6/365* (2013.01); *B60K 6/44* (2013.01); *B60K 6/445* (2013.01); *B60W 10/06* (2013.01); *B60W 10/08* (2013.01); *B60W 10/26* (2013.01); *B60W 20/00* (2013.01); *B60W 30/18036* (2013.01); *B60W 2520/10* (2013.01); *B60W 2540/00* (2013.01); *B60W 2710/0666* (2013.01); *B60W 2710/0677* (2013.01); *B60W 2710/083* (2013.01); *B60W 2710/086* (2013.01); *B60W 2710/248* (2013.01); *B60Y 2200/92* (2013.01); *Y02T 10/623* (2013.01); *Y02T 10/6239* (2013.01); *Y02T 10/6243* (2013.01); *Y02T 10/6286* (2013.01); *Y02T 10/7077* (2013.01); *Y10S 903/91* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 2010/0063704 A1* | 3/2010 | Okubo ................ | B60K 6/365 701/99 |
| 2016/0061304 A1* | 3/2016 | Kaltenbach ............ | F16H 3/66 475/5 |

FOREIGN PATENT DOCUMENTS

| | | |
|---|---|---|
| JP | 2010-195255 A | 9/2010 |
| JP | 2010-221745 A | 10/2010 |

* cited by examiner

*Primary Examiner* — Rami Khatib
(74) *Attorney, Agent, or Firm* — Oliff PLC

(57) ABSTRACT

In a state of reverse driving with load operation of an engine, an upper limit torque Temax of the engine is set to cause a total torque of a torque demand Tr* and a cancellation torque for cancelling a torque applied to a driveshaft accompanied with load operation of the engine to be output from a second motor to the driveshaft. A product of the upper limit torque Temax of the engine and an upper limit rotation speed Nemax of the engine is set to an upper limit power Pemax. A target power Pe* of the engine is then set in a range of not greater than the upper limit power Pemax. The engine, a first motor and the second motor are then controlled such as to cause the target power Pe* to be output from the engine and such as to output the torque demand Tr* to the driveshaft.

6 Claims, 5 Drawing Sheets

(51) Int. Cl.
*B60W 20/10* (2016.01)
*B60W 10/26* (2006.01)
*B60K 6/44* (2007.10)
*B60K 6/445* (2007.10)
*B60W 30/18* (2012.01)

HYBRID VEHICLE

This application claims priority to Japanese Patent Application No. 2014-188638 filed 17 Sep. 2014, the contents of which is incorporated herein by reference.

TECHNICAL FIELD

The present invention relates to a hybrid vehicle and more specifically a hybrid vehicle including an engine, a first motor configured to input and output power, a planetary gear having three rotational elements connected with a driveshaft linked with an axle, an output shaft of the engine and a rotating shaft of the first motor such that the driveshaft, the output shaft and the rotating shaft are arrayed in this sequence on a collinear diagram, a second motor configured to input and output power to and from the driveshaft, and a battery configured to transmit electric power to and from the first motor and the second motor.

BACKGROUND ART

A proposed configuration of such a hybrid vehicle includes an engine; a first rotating electrical machine; a first planetary mechanism having a ring gear, a carrier and a sun gear respectively connected with an axle, an output shaft of the engine and an output shaft of the first rotating electrical machine; a second rotating electrical machine; a second planetary mechanism having a ring gear and a sun gear respectively connected with the axle and an output shaft of the second rotating electrical machine and having a fixed carrier; and an accumulator device configured to transmit electric power to and from the first rotating electrical machine and the second rotating electrical machine. In the state of reverse driving, the proposed configuration of the hybrid vehicle starts the engine to start forcible charging of the accumulator device by the first rotating electrical machine when the SOC value of the accumulator device becomes equal to or less than a charge start threshold value, while terminating forcible charging when the SOC value becomes equal to or greater than a charge termination threshold value (see, for example, JP 2010-221745A). In the state of reverse driving, this hybrid vehicle reduces the charge start threshold value and the charge termination threshold value when the degree of inclination of a slope on which the hybrid vehicle runs is not less than an inclination threshold value, compared with those when the degree of inclination is less than the inclination threshold value. This delays starting of the engine and thereby delays reduction of the driving force at the axle due to the load operation of the engine, thus achieving a target sustainable running distance.

CITATION LIST

Patent Literature

PTL 1: JP 2010-221745A

SUMMARY OF INVENTION

Technical Problem

The prior art hybrid vehicle is, however, likely to deteriorate the driving performance in the state of reverse driving with load operation of the engine. According to the magnitude of the engine power or more specifically the magnitude of a torque in a forward driving direction applied from the engine via the first planetary mechanism to the axle, a torque in a reverse driving direction output from the second rotating electrical machine to the driveshaft is unlikely to sufficiently supply a torque demand in the reverse driving direction that is required for the driveshaft.

With regard to the hybrid vehicle, an object of the invention is to suppress deterioration of the driving performance in the state of reverse driving with load operation of the engine.

Solution to Problem

In order to solve at least part of the problems described above, the hybrid vehicle of the invention may be implemented by the following aspects or configurations.

According to one aspect of the invention, there is provided a hybrid vehicle including an engine; a first motor that is configured to input and output power; a planetary gear configured to have three rotational elements connected with a driveshaft linked with an axle, an output shaft of the engine and a rotating shaft of the first motor such that the driveshaft, the output shaft and the rotating shaft are arrayed in this sequence on a collinear diagram; a second motor that is configured to input and output power to and from the driveshaft; a battery that is configured to transmit electric power to and from the first motor and the second motor; and a controller that is configured to set an upper limit output of the engine in a specified state of reverse driving with load operation of the engine, such as to cause a total torque of a torque demand in a reverse driving direction that is required for the driveshaft and a cancellation torque for cancelling a torque in a forward driving direction applied to the driveshaft accompanied with the load operation of the engine to be output from the second motor the driveshaft, set a target output of the engine in a range of not greater than the upper limit output, and control the engine, the first motor and the second motor such as to cause the target output to be output from the engine and such as to drive the hybrid vehicle with the torque demand.

The hybrid vehicle of this aspect sets the upper limit output of the engine in the specified state of reverse driving with load operation of the engine, such as to cause the total torque of the torque demand in the reverse driving direction that is required for the driveshaft and the cancellation torque for cancelling the torque in the forward driving direction applied to the driveshaft accompanied with the load operation of the engine to be output from the second motor the driveshaft. The hybrid vehicle of this aspect then sets the target output of the engine in the range of not greater than the upper limit output, and controls the engine, the first motor and the second motor such as to cause the target output to be output from the engine and such as to drive the hybrid vehicle with the torque demand. Controlling the engine to cause the target output in the range of not greater than the upper limit output to be output from the engine enables the total torque of the torque demand and the cancellation torque to be output from the second motor to the driveshaft and provides the reverse driving with the torque demand. This results in suppressing deterioration of the driving performance in the state of reverse driving. This control is of great significance especially when the torque demand is more likely to increase, for example, during the reverse driving on an ascending slope. The load operation of the engine or more specifically power generation by the first motor using the output from the engine suppresses reduction of the state of charge of the battery. The "upper limit output" and the "target output" herein may denote an upper limit value and a target value of torque or may denote an upper limit value and a target value of power specified by the torque and the rotation speed.

DESCRIPTION OF EMBODIMENTS

The following describes some aspects of the invention with reference to embodiments.

Figure 1:
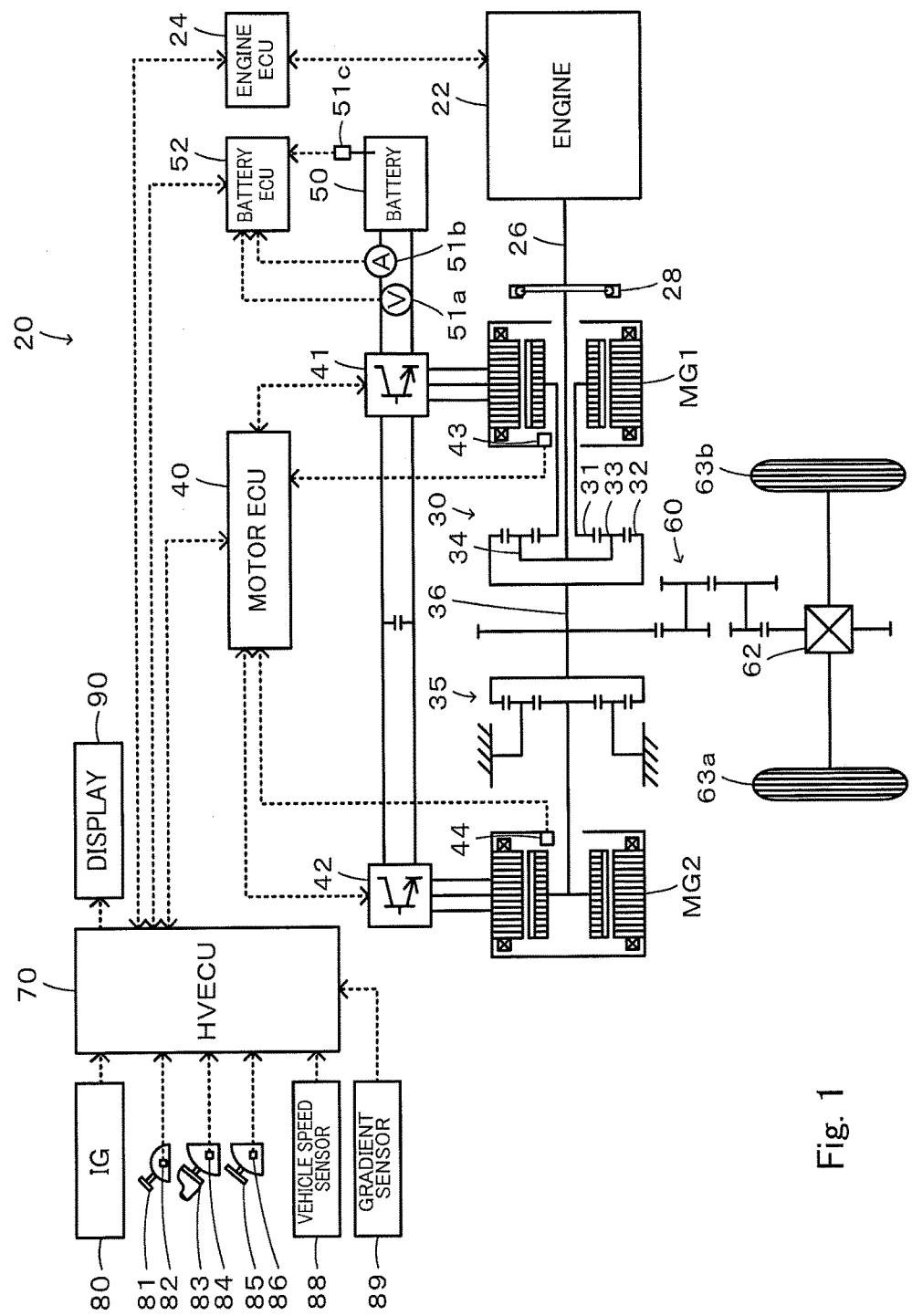
FIG. 1 is a configuration diagram illustrating the schematic configuration of a hybrid vehicle according to one embodiment of the invention.

FIG. 1 is a configuration diagram illustrating the schematic configuration of a hybrid vehicle 20 according to one embodiment of the invention. As illustrated, the hybrid vehicle 20 of the embodiment includes an engine 22 configured to output power by using a fuel such as gasoline or light oil; an engine electronic control unit (hereinafter referred to as "engine ECU") 24 configured to drive and control the engine 22; a single pinion-type planetary gear 30 configured such that a carrier 34 linked with a plurality of pinion gears 33 is connected via a damper 28 with a crankshaft 26 serving as an output shaft of the engine 22 and that a ring gear 32 is connected with a driveshaft 36 which is linked with drive wheels 63a and 63b via a differential gear 62 and a gear mechanism 60; a motor MG1 configured as, for example, a known synchronous motor generator to have a rotor connected with a sun gear 31 of the planetary gear 30; a motor MG2 configured as, for example, a known synchronous motor generator to have a rotor connected with the driveshaft 36 via a reduction gear 35; inverters 41 and 42 configured to drive the motors MG1 and MG2; a motor electronic control unit (hereinafter referred to as "motor ECU") 40 configured to drive and control the motors MG1 and MG2 by switching control of switching elements (not shown) of the inverters 41 and 42; a battery 50 configured as, for example, a lithium ion secondary battery to transmit electric power to and from the motors MG1 and MG2 via the inverters 41 and 42; a battery electronic control unit (hereinafter referred to as "battery ECU") 52 configured to manage the battery 50 and a hybrid electronic control unit (hereinafter referred to as "HVECU") 70 configured to control the entire vehicle.

The engine ECU 24 is implemented by a CPU-based microprocessor and includes a ROM that stores processing programs, a RAM that temporarily stores data, input and output ports and a communication port other than the CPU, although not being illustrated. The engine ECU 24 inputs, via its input port, signals from various sensors required for operation control of the engine 22, while outputting, via its output port, various control signals for operation control of the engine 22. The engine ECU 24 computes a rotation speed Ne of the engine 22, based on a signal from a crank position sensor (not shown) mounted to the crankshaft 26 of the engine 22.

The motor ECU 40 is implemented by a CPU-based microprocessor and includes a ROM that stores processing programs, a RAM that temporarily stores data, input and output ports and a communication port other than the CPU, although not being illustrated. The motor ECU 40 inputs, via its input port, signals from various sensors required for operation control of the motors MG1 and MG2, for example, rotational positions θm1 and θm2 of rotors of the motors MG1 and M2 from rotational position detection sensors 43 and 44 configured to detect the rotational positions of the rotors of the motors MG1 and MG2, while outputting, via its output port, for example, switching control signals to the switching elements of the inverters 41 and 42. The motor ECU 40 computes rotation speeds Nm1 and Nm2 of the motors MG1 and MG2, based on the rotational positions θm1 and θm2 of the rotors of the motors MG1 and M2 from the rotational position detection sensors 43 and 44.

The battery ECU 52 is implemented by a CPU-based microprocessor and includes a ROM that stores processing programs, a RAM that temporarily stores data, input and output ports and a communication port other than the CPU, although not being illustrated. The battery ECU 52 inputs, via its input port, signals from various sensors required for management of the battery 50, for example, an inter-terminal voltage Vb from a voltage sensor 51a provided between terminals of the battery 50, a charge-discharge current Ib from a current sensor 51b mounted to a power line connected with an output terminal of the battery 50 and a battery temperature Tb from a temperature sensor 51c mounted to the battery 50. The battery ECU 52 computes a state of charge SOC, which denotes a ratio of power capacity dischargeable from the battery 50 to the entire capacity, based on an integral value of the charge-discharge current Ib of the battery 50 detected by the current sensor 51b, for the purpose of management of the battery 50.

The HVECU 70 is implemented by a CPU-based microprocessor and includes a ROM that stores processing programs, a RAM that temporarily stores data, input and output ports and a communication port other than the CPU, although not being illustrated. The HVECU 70 inputs, via its input port, an ignition signal from an ignition switch 80, a shift position SP from a shift position sensor 82 configured to detect the operational position of a shift lever 81, an accelerator position Acc from an accelerator pedal position sensor 84 configured to detect the depression amount of an accelerator pedal 83, a brake pedal position BP from a brake pedal position sensor 86 configured to detect the depression amount of a brake pedal 85, a vehicle speed V from a vehicle speed sensor 88 and a road surface gradient erg from a gradient sensor 89, while outputting, via its output port, for example, display control signals to a display 90 configured to display information. The HVECU 70 is connected with the engine ECU 24, the motor ECU 40 and the battery ECU 52 to make communication and transmit various control signals and data to and from the engine ECU 24, the motor ECU 40 and the battery ECU 52. The hybrid vehicle 20 of the embodiment provides a parking position (P position) used for parking, a reverse position (R position) for reverse driving, a neutral position (N position) at a neutral gear and a drive position (D position) for forward driving, as the operational position of the shift lever 81 (the shift position SP detected by the shift position sensor 82).

The hybrid vehicle 20 of the embodiment having the above configuration runs in a hybrid drive mode (HV drive mode) driven with operation of the engine 22 and an electric drive mode (EV drive mode) driven without operation of the engine 22.

Figure 2:
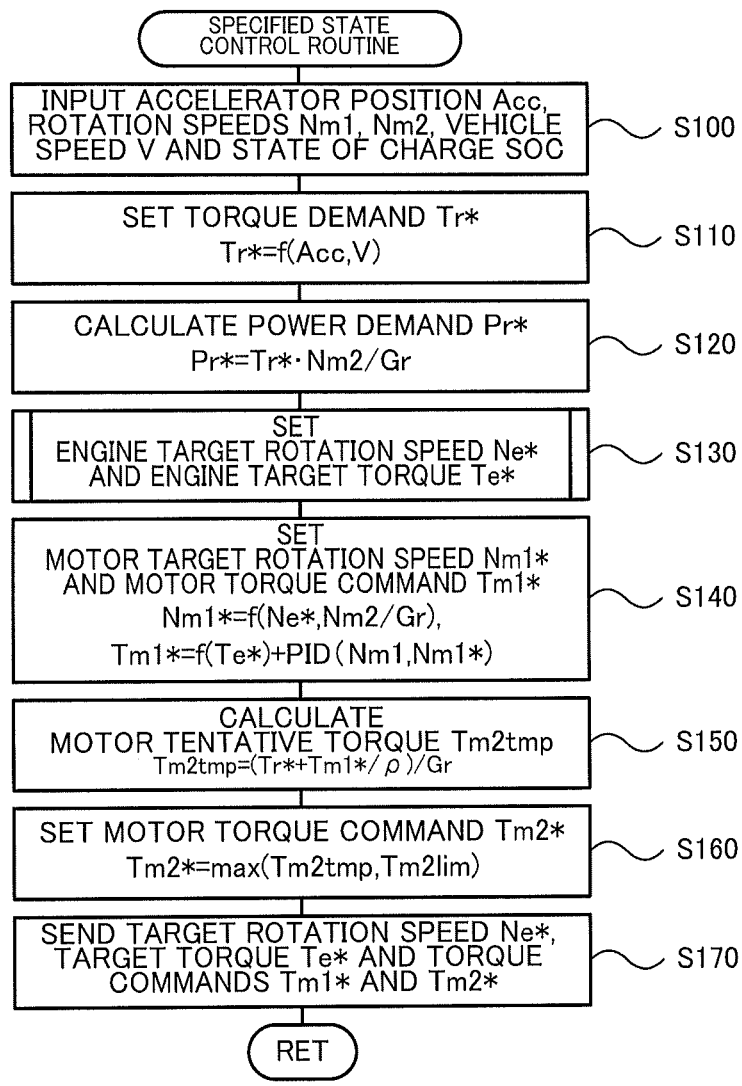
FIG. 2 is a flowchart showing one example of a specified state control routine performed by an HVECU according to the embodiment.

The following describes operations of the hybrid vehicle 20 of the embodiment having the above configuration or more specifically operations in a specified state of reverse driving with load operation of the engine 22. FIG. 2 is a flowchart showing one example of a specified state control routine performed by the HVECU 70 according to the embodiment. This routine is repeatedly performed at predetermined time intervals (for example, at every several msec) in the specified state.

On start of the specified state control routine, the HVECU 70 first inputs data required for control, for example, the accelerator position Acc from the accelerator pedal position sensor 84, the vehicle speed V from the vehicle speed sensor 88, the rotation speeds Nm1 and Nm2 of the motors MG1 and MG2 and the state of charge SOC of the battery 50 (step S100). The rotation speeds Nm1 and Nm2 of the motors MG1 and MG2 are computed based on the rotational positions θm1 and θm2 of the rotors of the motors MG1 and M2 from the rotational position detection sensors 43 and 44 and are input from the motor ECU 40 by communication. The state of charge SOC of the battery is computed based on the integral value of the charge-discharge current Ib of the battery 50 detected by the current sensor 51b and is input from the battery ECU 52 by communication.

Figure 3:
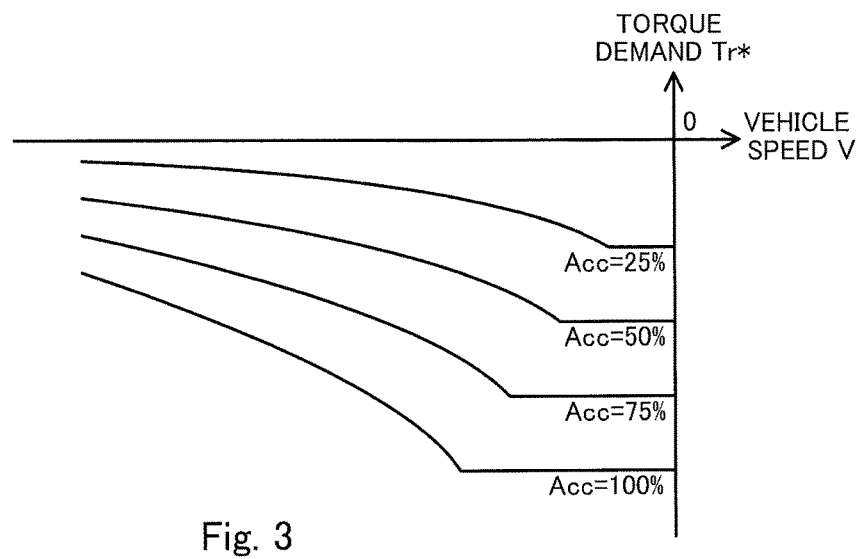
FIG. 3 is a diagram illustrating one example of a torque demand setting map.

After the data input, the HVECU 70 sets a torque demand Tr* required for driving (required for the driveshaft 36), based on the input accelerator position Acc and the input vehicle speed V (step S110), and multiplies the set torque demand Tr* by a rotation speed Nr of the driveshaft 36 to calculate a power demand Pr* required for driving (step S120). A procedure of setting the torque demand Tr* according to the embodiment stores predefined relationships between the vehicle speed V and the torque demand Tr* at different accelerator positions Acc as a torque demand setting map in the ROM (not shown), and reads and sets the torque demand Tr* corresponding to the given accelerator position Acc and the given vehicle speed V from the stored map. One example of the torque demand setting map is shown in FIG. 3. As illustrated, a negative value (value for reverse driving) is set to the torque demand Tr*. The rotation speed Nr of the driveshaft 36 may be calculated by dividing the rotation speed Nm2 of the motor MG2 by a gear ratio Gr of the reduction gear 35 or may be calculated by multiplying the vehicle speed V by a conversion factor.

Figure 4:
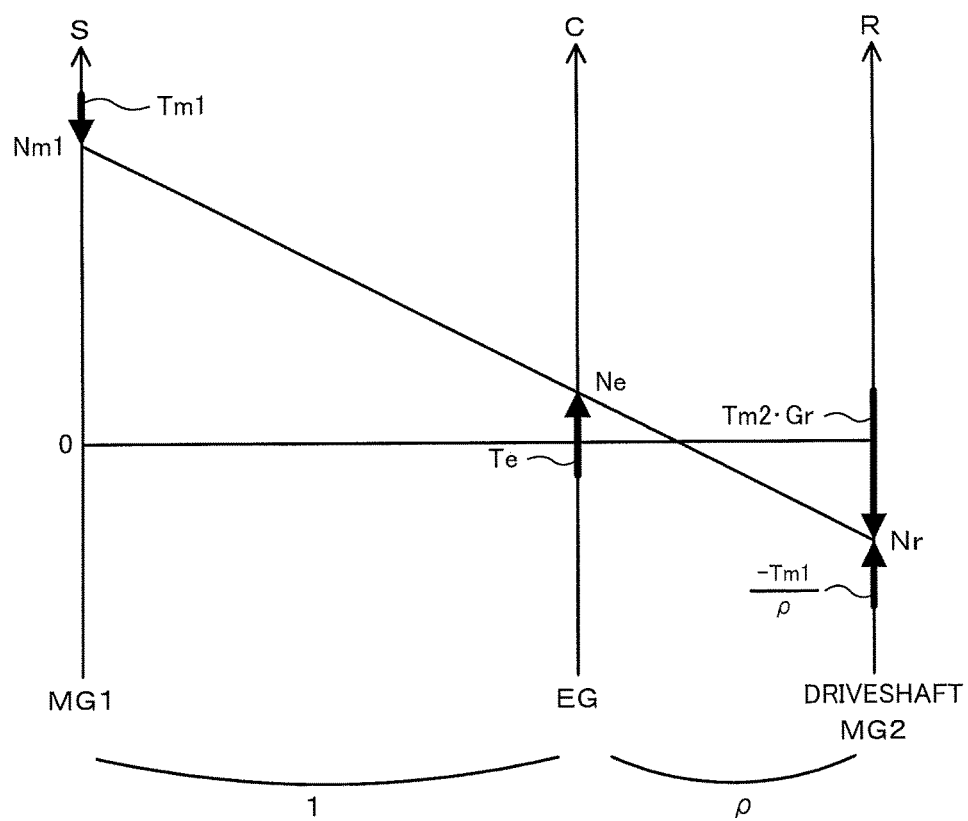
FIG. 4 is a collinear diagram illustrating one example of a dynamic relationship between rotation speed and torque with regard to rotational elements of a planetary gear in a specified state.

The HVECU 70 subsequently sets a target rotation speed Ne* and a target torque Te* that specify a target drive point of the engine 22 by an engine target drive point setting process described later (step S130). The HVECU 70 then calculates a target rotation speed Nm1* of the motor MG1 according to Equation (1) given below using the target rotation speed Ne* of the engine 22, the rotation speed Nr (=Nm2/Gr) of the driveshaft 36 and a gear ratio ρ of the planetary gear 30, and calculates a torque command Tm1* of the motor MG1 according to Equation (2) given below using the calculated target rotation speed Nm1* and the current rotation speed Nm1 of the motor MG1, the target torque Te* of the engine 22 and the gear ratio ρ of the planetary gear 30 (step S140). Equation (1) denotes a dynamic relational expression of rotational elements of the planetary gear 30. One example of a collinear diagram shown in FIG. 4 illustrates the dynamic relationship between the rotation speed and the torque with regard to the rotational elements of the planetary gear 30 in the specified state. In the diagram, an axis S on the left side shows a rotation speed of the sun gear 31 which is equal to the rotation speed Nm1 of the motor MG1; an axis C in the middle shows a rotation speed of the carrier 34 which is equal to the rotation speed Ne of the engine 22; and an axis R on the right side shows the rotation speed Nr of the ring gear 32 (driveshaft 36) obtained by dividing the rotation speed Nm2 of the motor MG2 by the gear ratio Gr of the reduction gear 35. In the diagram, two thick arrows on the axis R represent a torque output from the motor MG1 and applied to the drive shaft 36 via the planetary gear 30 and a torque output from the motor MG2 and applied to the driveshaft 36 via the reduction gear 35. Equation (1) is readily derived from this collinear diagram. Equation (2) denotes a relational expression in feedback control for rotating the motor MG1 at the target rotation speed Nm1* (i.e., for rotating the engine 22 at the target rotation speed Ne*). In Equation (2), the first term on the right side is a feedforward term, and the second term and the third term on the right side are a proportional and an integral term of feedback term. In Equation (2), "k1" in the second term on the right side denotes a gain of the proportional and "k2" in the third term on the right side denotes a gain of the integral term.

$$Nm1^*=Ne^*\cdot(1+\rho)/\rho-Nm2/(Gr\cdot\rho) \quad (1)$$

$$Tm1^*=-\rho\cdot Te^*/(1+\rho)+k1(Nm1^*-Nm1)+k2\int(Nm1^*-Nm1)dt \quad (2)$$

The HVECU 70 subsequently calculates a tentative torque Tm2tmp which is a tentative value of a torque command Tm2* of the motor MG2 according to Equation (3) given below by adding the result of division of the torque command Tm1* of the motor MG1 by the gear ratio ρ of the planetary gear 30 to the torque demand Tr* and dividing the result of addition by the gear ratio Gr of the reduction gear 35 (step S150), and limits the tentative torque Tm2tmp of the motor MG2 with a negative torque limit Tm2lim (lower limit guard) according to Equation (4) given below to set the torque command Tm2* of the motor MG2 (step S160). Equation (3) is readily derived from the collinear diagram of FIG. 4. The torque limit Tm2lim denotes a lower limit of torque (upper limit as the absolute value) to be output from the motor MG2 and may be, for example, a negative rated torque corresponding to the rotation speed Nm2 of the motor MG2.

$$Tm2\text{tmp}=(Tr^*+Tm1^*/\rho)/Gr \quad (3)$$

$$Tm2^*=\max(Tm2\text{tmp},Tm2\text{lim}) \quad (4)$$

After setting the target rotation speed Ne* and the target torque Te* of the engine 22 and the torque commands Tm1* and Tm2* of the motors MG1 and MG2, the HVECU 70 sends the target rotation speed Ne* and the target torque Te* of the engine 22 to the engine ECU 24, while sending the torque commands Tm1* and Tm2* of the motors MG1 and MG2 to the motor ECU 40 (step S170) and terminates this routine. When receiving the target rotation speed Ne* and the target torque Te* of the engine 22, the engine ECU 24 performs intake air amount control, fuel injection control and ignition control of the engine 22 such as to operate the engine 22 at a drive point specified by the target rotation speed Ne* and the target torque Te*. When receiving the torque commands Tm1* and Tm2* of the motors MG1 and MG2, the motor ECU 40 performs switching control of the switching elements of the inverters 41 and 42 such as to drive the motors MG1 and MG2 with the torque commands Tm1* and Tm2*.

Figure 5:
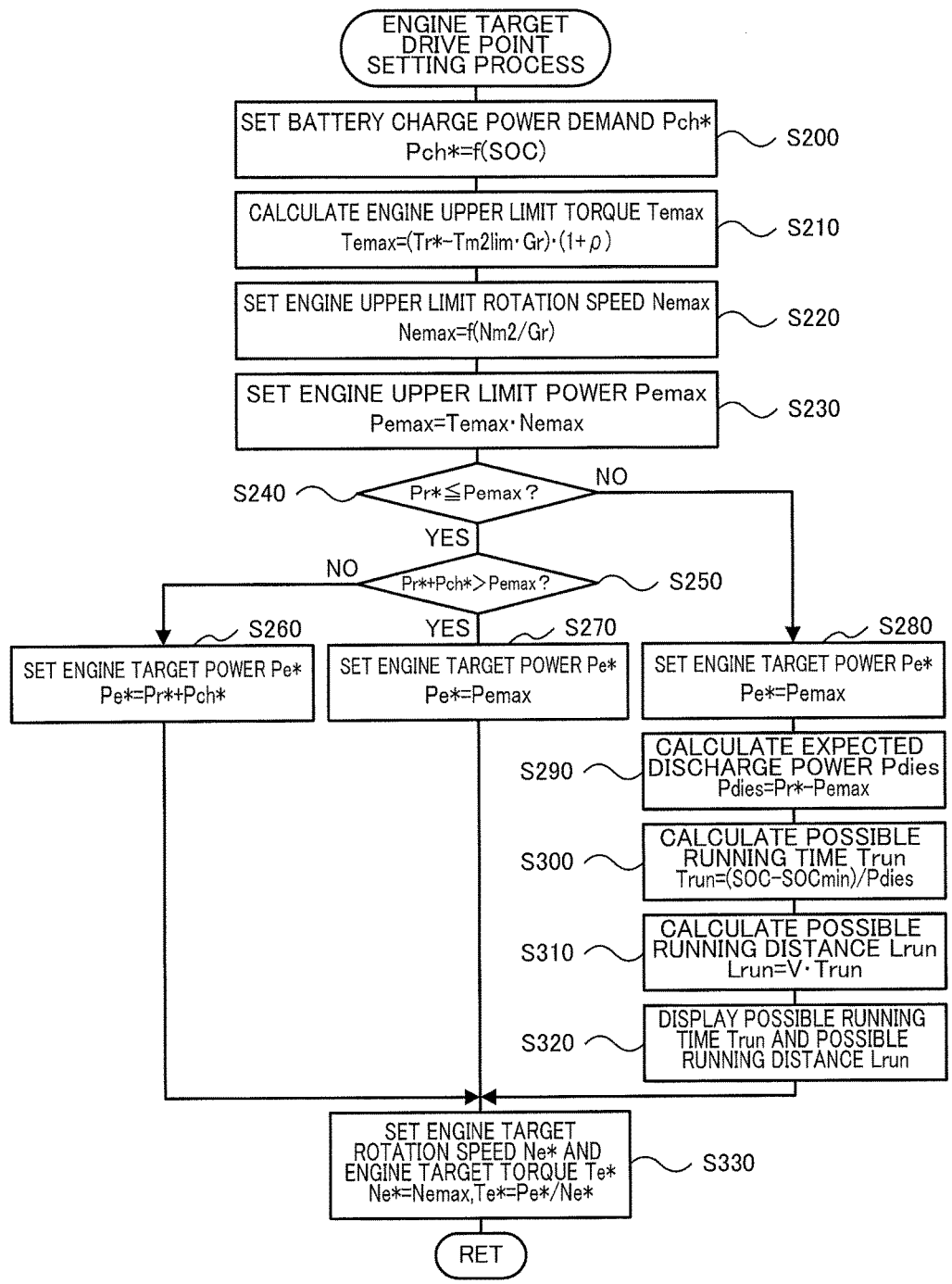
FIG. 5 is a flowchart showing one example of an engine target drive point setting process.

The following describes the details of the engine target drive point setting process at step S130 in the specified state control routine of FIG. 2 to set the target rotation speed Ne* and the target torque Te* of the engine 22 with reference to FIG. 5.

On start of the engine target drive point setting process, the HVECU 70 first sets a charge power demand Pch* of the battery 50 based on the state of charge SOC of the battery 50 (step S200). A procedure of setting the charge power demand Pch* of the battery 50 according to the embodiment stores a predefined relationship between the state of charge SOC of the battery 50 and the charge power demand Pch* in the ROM (not shown), and reads and sets the charge power demand Pch* corresponding to the given state of charge SOC from the stored map. When the state of charge SOC is lower than a target state SOC* (for example, 50%, 55% or 60%), this charge power demand Pch* is set in a range of greater than a value 0 (in a range of charging) in such a tendency as to increase with a decrease in state of charge SOC. When the state of charge SOC is higher than the target state SOC*, on the other hand, the charge power demand Pch* is set in a range of less than the value 0 (in a range of discharging) in such a tendency as to decrease (increase as the absolute value) with an increase in state of charge SOC. In the state of reverse driving with load operation of the engine, the lower limit of torque to be output to the driveshaft 36 is increased (is decreased as the absolute value) by a torque in a forward driving direction (hereinafter called "direct torque") that is output from the engine 22 and is applied to the driveshaft 36 via the planetary gear 30. Accordingly, when there is no need to charge the battery 50, it is preferable to stop the operation of the engine 22 and use the torque (power) from the motor MG2 for reverse driving without performing the specified state control routine of FIG. 2. By taking into account this factor, the following description is on the assumption that there is a need for load operation of the engine 22 (there is a need to charge the battery 50).

The HVECU 70 subsequently calculates an upper limit torque Temax of the engine 22 according to Equation (5) given below using the torque demand Tr*, the torque limit Tm2lim of the motor MG2, the gear ratio ρ of the planetary gear 30 and the gear ratio Gr of the reduction gear 35 (step S210). In Equation (5), "Tm2lim·Gr" denotes a lower limit of torque to be output from the motor MG2 to the driveshaft 36 (upper limit of torque in a reverse driving direction). "Temax/(1+ρ)" obtained by dividing both sides of Equation (5) by (1+ρ) denotes an upper limit of direct torque from the engine 22 (upper limit of torque in the forward driving direction). Accordingly, Equation (5) calculates the upper limit torque Temax such as to enable the torque demand Tr* to be output to the driveshaft 36 by the torque Temax/(1+ρ) in the forward driving direction and the torque Tm2lim·Gr in the reverse driving direction. As understood from Equation (5), the upper limit torque Temax decreases with a decrease in torque demand Tr* (with an increase in torque in the reverse driving direction).

$$Temx = (Tr^* - Tm2lim \cdot Gr) \cdot (1+\rho) \quad (5)$$

Figure 6:
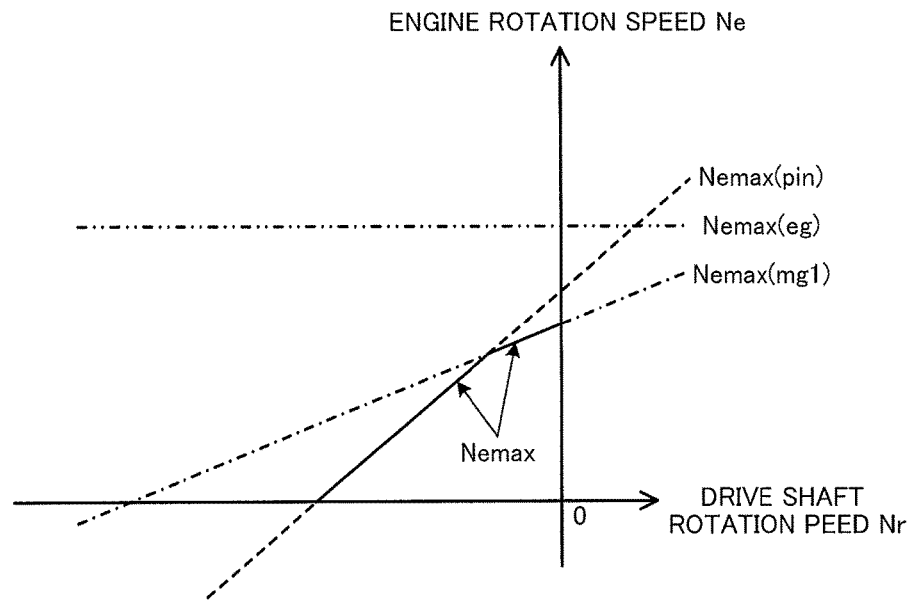
FIG. 6 is a diagram illustrating one example of a relationship between rotation speed Nr of a driveshaft and an upper limit rotation speed Nemax of an engine.

The HVECU 70 subsequently sets an upper limit rotation speed Nemax of the engine 22 based on the rotation speed Nr (=Nm2/Gr) of the driveshaft 36 (step S220) and sets the product of the upper limit torque Temax and the upper limit rotation speed Nemax of the engine 22 to an upper limit power Pemax of the engine 22 (step S230). The upper limit rotation speed Nemax may be calculated by the following procedure according to this embodiment. The procedure first calculates an upper limit rotation speed Nemax(mg1) of the engine 22 based on the performance of the motor MG1 according to Equation (6) given below using an upper limit rotation speed Nm1max as a positive rated rotation speed of the motor MG1, the rotation speed Nr of the driveshaft 36 and the gear ratio ρ (number of teeth of sun gear 31/number of teeth of ring gear 32) of the planetary gear 30. Equation (6) is readily derived from the collinear diagram of FIG. 4 described above. The procedure subsequently calculates an upper limit rotation speed Nemax(pin) of the engine 22 based on the performance of the pinion gear 33 according to Equation (7) given below using an upper limit rotation speed Npinmax as a positive rated rotation speed of the pinion gear 33 of the planetary gear 30, the rotation speed Nr of the driveshaft 36 and a gear ratio γ of the pinion gear 33 of the planetary gear 30 (number of teeth of pinion gear 33/number of teeth of ring gear 32). The procedure then applies a lower limit guard with the value 0 to a minimum value among the upper limit rotation speeds Nemax (mg) and Nemax (pin) of the engine 22 and an upper limit rotation speed Nemax (eg) as a rated rotation speed of the engine 22 according to Equation (8) given below, so as to set the upper limit rotation speed Nemax of the engine 22. One example of the relationship between the rotation speed Nr of the driveshaft 36 and the upper limit rotation speed Nemax of the engine 22 is shown in FIG. 6. Setting the upper limit rotation speed Nemax to the target rotation speed Ne* of the engine 22 at step S330 described later increases the rotation speed of the engine 22, while protecting the engine 22, the motor MG1 and the pinion gear 33 of the planetary gear 30. When a smaller power than the upper limit power Pemax is to be output from the engine 22, this configuration decreases the torque to be output from the engine 22 and decreases the direct torque from the engine 22 (torque in the forward driving direction), compared with the configuration that the engine 22 is driven with a lower rotation speed than the upper limit rotation speed Nemax. The upper limit toque Temax decreases with a decrease in torque demand Tr* (with an increase in torque in the reverse driving direction) as described above, so that the upper limit power Pemax decreases with a decrease in torque demand Tr*.

$$Nemax(mg1) = \rho \cdot Nm1max/(1+\rho) + Nm2/(Gr \cdot (1+\rho)) \quad (6)$$

$$Nemax(pin) = Nm2/Gr + \gamma \cdot Npinmax \quad (7)$$

$$Nemax = max(min(Nemax(mg1), Nemax(pin), Nemax(eg)), 0) \quad (8)$$

The HVECU 70 subsequently compares the power demand Pr* with the upper limit power Pemax of the engine 22 (step S240) and compares the sum (Pr*+Pch*) of the power demand Pr* and the charge power demand Pch* of the battery 50 with the upper limit power Pemax of the engine 22 (step S250).

When the power demand Pr* and the sum (Pr*+Pch*) are not greater than the upper limit power Pemax of the engine 22 at steps S240 and S250, the HVECU 70 sets the sum (Pr*+Pch*) to a target power Pe* of the engine 22 (step S260). The HVECU 70 then sets the upper limit rotation speed Ne of the engine 22 to the target rotation speed Ne* of the engine 22, and divides the target power Pe* by the target rotation speed Ne* of the engine 22 to set the target torque Te* of to engine 22 (step S330) and terminates the engine target drive point setting process. The target torque Te* is set to a value of not greater than the upper limit torque Temax by setting the sum (Pr*+Pch*) of not greater than the upper limit power Pemax(=Temax·Nemax) to the target power Pe* and setting the upper limit rotation speed Nemax to the target rotation speed Ne*.

In this case, when a value of not greater than the upper limit torque Temax is set to the target torque Te* at step 330, the tentative torque Tm2tmp of the motor MG2 set at step S150 in FIG. 2 is basically a value in the range of the torque limit Tm2lim by the relationship between the feedforward term of Equation (2), Equation (3) and Equation (5) given above. Accordingly, at step S160, the tentative torque Tm2tmp is set to the torque command Tm2*. This enables a total torque of the torque demand Tr* and a cancellation torque Tc for cancelling the direct torque from the engine 22 to be output from the motor MG2 to the driveshaft 36. As a result, this provides reverse driving with the torque demand Tr* (power demand Pr*). In this case, the battery 50 is chargeable with electric power corresponding to the charge powder demand Pch* by setting the sum (Pr*+Pch*) greater than the power demand Pr* to the target power Pe* at step S260. This suppresses reduction of the state of charge SOC of the battery 50.

When the power demand Pr* is not greater than the upper limit power Pemax of the engine 22 at step S240 and the sum (Pr*+Pch*) is greater than the upper limit power Pemax of the engine 22 at step S250, the HVECU 70 sets the upper limit power Pemax(=Nemax·Temax) to the target power Pe* of the engine 22. The HVECU 70 then sets the upper limit rotation speed Nemax of the engine 22 to the target rotation speed Ne* of the engine 22 and sets the result of division of the target power Pe* by the target rotation speed Ne* of the engine 22, i.e., the upper limit torque Temax, to the target torque Te* of the engine 22 (step S330) and terminates the engine target drive point setting process.

In this case, setting the upper limit torque Temax to the target torque Te* at step S330 provides the reverse driving with the torque demand Tr* (power demand Pr*), as in the case that the power demand Pr* and the sum (Pr*+Pch*) are not greater than the upper limit power Pemax of the engine 22. In this case, by setting the upper limit power Pemax of not less than the power demand Pr* to the target power Pe* at step S270, when the power demand Pr* is smaller than the upper limit power Pemax, the battery 50 is chargeable with electric power corresponding to the result of subtraction (Pemax−Pr*) of the power demand Pr* from the upper limit power Pemax. When the power demand Pr* is equal to the upper limit power Pemax, the battery 50 is neither charged nor discharged. This suppresses reduction of the state of charge SOC of the battery 50.

When the power demand Pr* is greater than the upper limit power Pemax of the engine 22 at step S240, the HVECU 70 sets the upper limit power Pemax to the target power Pe* of the engine 22 (step S280). The HVECU 70 subsequently subtracts the upper limit power Pemax from the power demand Pr* to calculate an expected discharge power Pdies that is expected to be discharged from the battery 50 during driving with the power demand Pr* (step S290). The HVECU 70 then divides the result of subtraction (SOC−SOCmin) of an allowable lower limit state SOCmin from the state of charge SOC of the battery 50 by the expected discharge power Pdies to calculate a possible running time Trun before the state of charge SOC of the battery 50 reaches the allowable lower limit state SOCmin (step S300). The HVECU 70 subsequently multiplies the vehicle speed V by the possible running time Trun to calculate a possible running distance Lrun before the state of charge SOC of the battery 50 reaches the allowable lower limit state SOCmin (step S310) and outputs and displays the calculated possible running time Trun and the calculated possible running distance Lrun to and on the display (step S320). The allowable lower limit state SOCmin is determined according to the characteristics of the battery 50 and may be, for example, 20%, 25% or 30%.

Outputting and displaying the possible running time Trun and the possible running distance Lrun to and on the display 90 informs the driver of the possible running time Trun and the possible running distance Lrun. As a result, this urges the informed driver to determine whether there is a need for an operation to increase the possible running time Trun and the possible running distance Lrun, for example, an operation of reducing the depression amount of the accelerator pedal 83 (to decrease the power demand Pr*).

The HVECU 70 then sets the upper limit rotation speed Nemax to the target rotation speed Ne* of the engine 22 and sets the result of division of the target power Pe* (in this case, upper limit power Pemax (=Nemax·Temax)) by the target rotation speed Ne* of the engine 22, i.e., the upper limit torque Temax, to the target torque Te* of the engine 22 (step S330) and terminates the engine target drive point setting process.

In this case, setting the upper limit torque Temax to the target torque Te* at step S330 provides the reverse driving with the torque demand Tr* (power demand Pr*), as in the case that the power demand Pr* and the sum (Pr*+Pch*) are not greater than the upper limit power Pemax of the engine 22. In this case, by setting the upper limit power Pemax to the target power Pe* at step S280, electric power corresponding to the result of subtraction (Pr*−Pemax) of the upper limit power Pemax from the power demand Pr* is discharged from the battery 50, in order to provide the reverse driving with the power demand Pr*.

Figure 7:
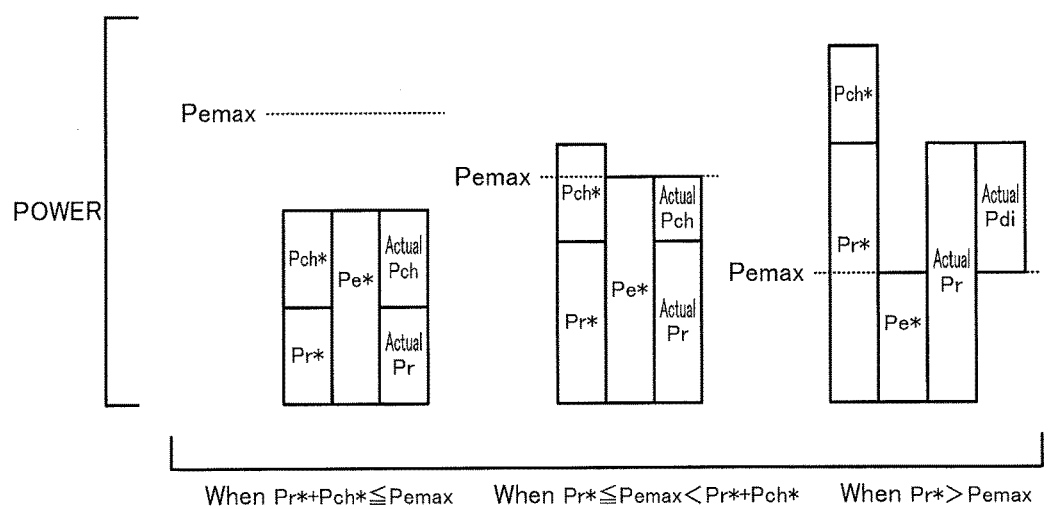
FIG. 7 is a diagram illustrating one example of a relationship between power demand Pr, charge power demand Pch* of a battery, target power Pe* of the engine, actual running power (actual Pr), and actual charge-discharge power of the battery (actual Pch during charge and actual Pdi during discharge) in the case of a request for charging the battery in the specified state.

FIG. 7 is a diagram illustrating one example of the relationship between the power demand Pr*, the charge power demand Pch* of the battery 50, the target power Pe* of the engine 22, the actual running power (actual Pr), and the actual charge-discharge power of the battery 50 (actual Pch during charge and actual Pdi during discharge) in the case of a request for charging the battery 50 in the specified state. In this diagram, the upper limit power Pemax decreases with an increase in power demand Pr*, because of the reason described previously.

As shown by the left-side chart, when the sum (Pr*+Pch*) of the power demand Pr* and the charge power demand Pch* is not greater than the upper limit power Pemax, the sum (Pr*+Pch*) is set to the target power Pe*. This provides the reverse driving with the running power (actual Pr) corresponding to the power demand Pr*, while charging the battery 50 with the electric power (actual Pch) corresponding to the charge power demand Pch*.

As shown by the middle chart, when the power demand Pr* is not greater than the upper limit power Pemax and the sum (Pr*+Pch*) is greater than the upper limit power Pemax, the upper limit power Pemax is set to the target power Pe*. When the power demand Pr* is smaller than the upper limit power Pemax, this provides the reverse driving with the running power (actual Pr) corresponding to the power demand Pr*, while charging the battery 50 with the electric power (actual Pch) corresponding to the result of subtraction of the power demand Pr* from the upper limit power Pemax. When the power demand Pr* is equal to the upper limit power Pemax, this provides the reverse driving with the running power (actual Pr) corresponding to the power demand Pr* without charging or discharging the battery 50.

As shown by the right-side chart, when the power demand Pr* is greater than the upper limit power Pemax, the upper limit power Pemax is set to the target power Pe*. This provides the reverse driving with the running power (actual Pr) corresponding to the power demand Pr*, while causing the electric power (actual Pdi) corresponding to the result of subtraction of the upper limit power Pemax from the power demand Pr* to be discharged from the battery 50.

Irrespective of the power demand Pr*, any case provides the reverse driving with the running power (actual Pr) corresponding to the power demand Pr*. As a result, this suppresses deterioration of the driving performance during the reverse driving. This control is of great significance especially when the power demand Pr* is more likely to increase, for example, during the reverse driving on an ascending slope.

As described above, in the specified state of reverse driving with load operation of the engine 22, the hybrid vehicle 20 of the embodiment sets the upper limit power Pemax of the engine 22, such as to enable the total torque of the torque demand Tr* and the cancellation torque Tc for cancelling the torque in the forward driving direction (direct torque) applied to the driveshaft 36 accompanied with load operation of the engine 22 to be output from the motor MG2 to the driveshaft 36, and controls the engine 22 and the motors MG1 and MG2 such as to operate the engine 22 in the range of not greater than the upper limit power Pemax and such as to cause the total torque of the torque demand Tr* and the cancellation torque Tc to be output from the motor MG2 to the driveshaft 36. This provides the reverse driving with the torque demand Tr* (power demand Pr*) and suppresses deterioration of the driving performance during reverse driving.

In the specified state, when the sum of the power demand Pr* and the charge power demand Pch* is not greater than the upper limit power Pemax, the sum of the power demand Pr* and the charge power demand Pch* is set to the target power Pe*. This provides the reverse driving with the torque demand Tr* (power demand Pr*) while charging the battery 50 with the electric power corresponding to the charge power demand Pch*. Accordingly, this provides the reverse driving with the torque demand Tr*, while suppressing reduction of the state of charge SOC of the battery 50.

In the specified state, when the power demand Pr* is not greater than the upper limit power Pemax and the sum of the power demand Pr* and the charge power demand Pch* is greater than the upper limit power Pemax, the upper limit power Pemax is set to the target power Pe*. When the power demand Pr* is smaller than the upper limit power Pemax, this provides the reverse driving with the torque demand Tr* (power demand Pr*) while charging the battery 50 with the electric power corresponding to the result of subtraction of the power demand Pr* from the upper limit power Pemax. When the power demand Pr* is equal to the upper limit power Pemax, this provides the reverse driving with the torque demand Tr* without charging or discharging the battery 50. Accordingly, this provides the reverse driving with the torque demand Tr*, while suppressing reduction of the state of charge SOC of the battery 50.

Additionally, in the specified state, when the power demand Pr* is greater than the upper limit power Pemax, the upper limit power Pemax is set to the target power Pe*. This provides the reverse driving with the torque demand Tr* (power demand Pr*), while discharging the battery 50.

When the power demand Pr* is greater than the upper limit power Pemax in the specified state, the hybrid vehicle 20 of the embodiment calculates the possible running time Trun and the possible running distance Lrun. According to other embodiments, only either one or neither of the possible running time Trun and the possible running distance Lrun may be calculated.

When the power demand Pr* is greater than the upper limit power Pemax, the hybrid vehicle 20 of the embodiment outputs and displays the possible running time Trun and the possible running distance Lrun to and on the display 90. According to other embodiments, only either one or neither of the possible running time Trun and the possible running distance may be output to and displayed on the display 90.

The hybrid vehicle 20 of the embodiment sets the target power Pe* in the range of not greater than the upper limit power Pemax by using the magnitude relationship between the power demand Pr* and the upper limit power Pemax and the magnitude relationship between the sum of the power demand Pr* and the charge power demand Pch* of the battery 50 and the upper limit power Pemax. According to another embodiment, the target torque Te* may be set in the range of not greater than the upper limit power Pemax by using torque equivalents of the driveshaft 36 to the torque demand Tr* and the upper limit torque Temax and a torque equivalent of the driveshaft 36 to the charge power demand Pch*.

In the specified state, the hybrid vehicle 20 of the embodiment sets the upper limit rotation speed Nemax of the engine 22 by applying the lower limit guard with the value 0 to the minimum value among the upper limit rotation speed Nemax(mg1) of the engine 22 based on the performance of the motor MG1, the upper limit rotation speed Nemax(pin) of the engine 22 based on the performance of the pinion gear 33 and the upper limit rotation speed Nemax(eg) as the rated value of the engine 22. According to other embodiments, the upper limit rotation speed Nemax may be set accordingly to only the rotation speed Nr of the driveshaft 36 or may be set to a fixed value.

The hybrid vehicle 20 of the embodiment sets the charge power demand Pch* of the battery 50 in the specified state according to the state of charge SOC of the battery 50. According to another embodiment, the charge power demand Pch* of the battery 50 may be set by taking into account the inter-terminal voltage Vb and the battery temperature Tb of the battery 50 in addition to the state of charge SOC.

In the hybrid vehicle 20 of the embodiment, the planetary gear 30 has the single pinion-type configuration. According to another embodiment, the planetary gear 30 may have a double pinion-type configuration as long as three rotational elements are connected with the driveshaft 36, the crankshaft 26 of the engine 22 and the rotating shaft of the motor MG1 such that the driveshaft 36, the crankshaft 26 and the rotating shaft are arrayed in this sequence on a collinear diagram.

In the hybrid vehicle 20 of the embodiment, the rotating shaft of the motor MG2 is connected with the driveshaft 36 via the reduction gear 35. According to other embodiments, the rotating shaft of the motor MG2 may be connected with the driveshaft 36 via a stepped transmission such as 2-speed or 3-speed transmission or a continuously variable transmission or may be directly connected with the driveshaft 36 without using the reduction gear 35 or a transmission.

The following describes the correspondence relationship between the primary components of the embodiment and the primary components of the invention described in Summary of Invention. The engine 22 of the embodiment corresponds to the "engine"; the motor MG1 corresponds to the "first motor"; the planetary gear 30 corresponds to the "planetary gear"; the motor MG2 corresponds to the "second motor"; and the battery 50 corresponds to the "battery". The HVECU 70 that performs the specified state control routine of FIG. 2 including the engine target drive point setting process of FIG. 5, the engine ECU 24 that controls the engine 22 based on the target rotation speed Ne* and the target torque Te* of the engine 22 sent from the HVECU 70, and the motor ECU 40 that controls the motors MG1 and MG2 (inverters 41 and 42) based on the torque commands Tm1* and Tm2* of the motors MG1 and MG2 sent from the HVECU 70 correspond to the "controller".

In the hybrid vehicle of the above aspect, in the specified state, the controller may refer to at least one of a magnitude relationship between a power demand corresponding to the torque demand and an upper limit power as the upper limit output and a magnitude relationship between a sum of the power demand and a charge power demand of the battery and the upper limit power, and may set a target power as the target output in a range of not greater than the upper limit power.

In the hybrid vehicle of the above aspect configured to set the target power in the specified state according to at least one of the magnitude relationship between the power demand and the upper limit power and the magnitude relationship between the sum of the power demand and the charge power demand and the upper limit power, in the specified state, when the sum of the power demand and the charge power demand is not greater than the upper limit power, the controller may set the sum of the power demand and the charge power demand to the target power. This configuration enables the hybrid vehicle to be reversely driven with the torque demand, while charging the battery with electric power corresponding to the charge power demand.

In the hybrid vehicle of the above aspect configured to set the target power in the specified state according to at least one of the magnitude relationship between the power demand and the upper limit power and the magnitude relationship between the sum of the power demand and the charge power demand and the upper limit power, in the specified state, when the power demand is greater than the upper limit power or when the power demand is not greater than the upper limit power and the sum of the power demand and the charge power demand is greater than the upper limit power, the controller may set the upper limit power to the target power. When the power demand is smaller the upper limit power and the sum of the power demand and the charge power demand is greater than the upper limit power, this configuration enables the hybrid vehicle to be reversely driven with the torque demand, while charging the battery with electric power corresponding to the result of subtraction of the power demand from the upper limit power. When the power demand is equal to the upper limit power and the sum of the power demand and the charge power demand is greater than the upper limit power, this configuration enables the hybrid vehicle to be reversely driven with the torque demand with neither charging nor discharging the battery. When the power demand is greater than the upper limit power, on the other hand, this configuration enables the hybrid vehicle to be reversely driven with the torque demand, while causing electric power corresponding to the result of subtraction of the upper limit power from the power demand to be discharged from the battery (this results in reducing the state of charge of the battery). The hybrid vehicle of this aspect may further comprise a display unit that is configured to display information. In the specified state, when the power demand is greater than the upper limit power, the controller may control the display unit to display at least one of a possible running time when reverse driving is sustainable and a possible running distance. This configuration informs the driver of the possible running time and the possible running distance. In the hybrid vehicle of this aspect, in the specified state, when the power demand is greater than the upper limit power, the controller may calculate the possible running time by dividing a difference between a state of charge of the battery and an allowable lower limit state by a difference between the power demand and the upper limit power, and may calculate the possible running distance as a product of a vehicle speed and the possible running time.

In the hybrid vehicle of the above aspect configured to set the target power in the specified state according to at least one of the magnitude relationship between the power demand and the upper limit power and the magnitude relationship between the sum of the power demand and the charge power demand and the upper limit power, the controller may set a product of an upper limit torque of the engine and an upper limit rotation speed of the engine to the upper limit power in the specified state. The upper limit torque of the engine may be obtained by converting a difference between the torque demand and an upper limit torque in the reverse driving direction to be output from the second motor to the driveshaft into a torque of the output shaft. In the hybrid vehicle of this aspect, the upper limit rotation speed may be set by applying a lower limit guard with a value 0 to a minimum value among a first tentative upper limit rotation speed that is an upper limit rotation speed of the engine based on the performance of a pinion gear of the planetary gear, a second tentative upper limit rotation speed that is an upper limit rotation speed of the engine based on the performance of the first motor and a third tentative upper limit rotation speed that is a rated value of the engine. This configuration protects the engine, the first motor and the pinion gear of the planetary gear.

The correspondence relationship between the primary components of the embodiment and the primary components of the invention, regarding which the problem is described in Summary of Invention, should not be considered to limit the components of the invention, regarding which the problem is described in Summary of Invention, since the embodiment is only illustrative to specifically describes the aspects of the invention, regarding which the problem is described in Summary of Invention. In other words, the invention, regarding which the problem is described in Summary of Invention, should be interpreted on the basis of the description in the Summary of Invention, and the embodiment is only a specific example of the invention, regarding which the problem is described in Summary of Invention.

The aspect of the invention is described above with reference to the embodiment. The invention is, however, not limited to the above embodiment but various modifications and variations may be made to the embodiment without departing from the scope of the invention.

INDUSTRIAL APPLICABILITY

The invention is applicable to, for example, manufacturing industries of hybrid vehicles.

The invention claimed is:

1. A hybrid vehicle, comprising
an engine;
a first motor that is configured to input and output power;
a planetary gear configured to have three rotational elements connected with a driveshaft linked with an axle, an output shaft of the engine and a rotating shaft of the first motor such that the driveshaft, the output shaft and the rotating shaft are arrayed in this sequence on a collinear diagram;
a second motor that is configured to input and output power to and from the driveshaft;
a battery that is configured to transmit electric power to and from the first motor and the second motor; and
a controller that is configured to set an upper limit output of the engine in a specified state of reverse driving with load operation of the engine, to cause a total torque of a torque demand in a reverse driving direction that is required for the driveshaft and a cancellation torque for cancelling a torque in a forward driving direction applied to the driveshaft accompanied with the load operation of the engine to be output from the second motor the driveshaft, set a target output of the engine in a range of not greater than the upper limit output, and control the engine, the first motor and the second motor to cause the target output to be output from the engine and to drive the hybrid vehicle with the torque demand,
wherein in the specified state, the controller refers to at least one of a magnitude relationship between a power demand corresponding to the torque demand and an upper limit power as the upper limit output and a magnitude relationship between a sum of the power demand and a charge power demand of the battery and the upper limit power, and sets a target power as the target output in a range of not greater than the upper limit power.

2. The hybrid vehicle according to claim 1,
wherein in the specified state, when the sum of the power demand and the charge power demand is not greater than the upper limit power, the controller sets the sum of the power demand and the charge power demand to the target power.

3. The hybrid vehicle according to claim 1,
wherein in the specified state, when the power demand is greater than the upper limit power or when the power demand is not greater than the upper limit power and the sum of the power demand and the charge power demand is greater than the upper limit power, the controller sets the upper limit power to the target power.

4. The hybrid vehicle according to claim 3, further comprising
a display unit that is configured to display information, wherein
in the specified state, when the power demand is greater than the upper limit power, the controller controls the display unit to display at least one of a running time when reverse driving is sustainable and a running distance.

5. The hybrid vehicle according to claim 4,
wherein in the specified state, when the power demand is greater than the upper limit power, the controller calculates the running time by dividing a difference between a state of charge of the battery and an allowable lower limit state by a difference between the power demand and the upper limit power, and calculates the running distance as a product of a vehicle speed and the running time.

6. The hybrid vehicle according to claim 1,
wherein in the specified state, the controller sets a product of an upper limit torque of the engine and an upper limit rotation speed of the engine to the upper limit power, wherein the upper limit torque of the engine is obtained by converting a difference between the torque demand and an upper limit torque in the reverse driving direction to be output from the second motor to the driveshaft into a torque of the output shaft.

* * * * *